United States Patent
Bathe et al.

(10) Patent No.: US 11,461,827 B2
(45) Date of Patent: Oct. 4, 2022

(54) SYSTEMS AND METHODS FOR GENERATING BASKET AND ITEM QUANTITY PREDICTIONS USING MACHINE LEARNING ARCHITECTURES

(71) Applicant: Walmart Apollo, LLC, Bentonville, AR (US)

(72) Inventors: Sonal Bathe, Sunnyvale, CA (US); Aleksandra Cerekovic, Sunnyvale, CA (US); Rahul Sridhar, Santa Clara, CA (US); Sinduja Subramaniam, San Jose, CA (US); Evren Korpeoglu, San Jose, CA (US); Kannan Achan, Saratoga, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 17/163,406

(22) Filed: Jan. 30, 2021

(65) Prior Publication Data
US 2022/0245713 A1    Aug. 4, 2022

(51) Int. Cl.
*G06Q 30/00* (2012.01)
*G06Q 30/06* (2012.01)
*G06N 20/00* (2019.01)

(52) U.S. Cl.
CPC ......... *G06Q 30/0633* (2013.01); *G06N 20/00* (2019.01); *G06Q 30/0631* (2013.01); *G06Q 30/0641* (2013.01)

(58) Field of Classification Search
None
See application file for complete search history.

(56) References Cited

U.S. PATENT DOCUMENTS

| | | |
|---|---|---|
| 6,317,722 B1 | 11/2001 | Jacobi et al. |
| 9,530,142 B2 | 12/2016 | Minsky et al. |
| 2014/0244442 A1 | 8/2014 | Hirsch |
| 2017/0032446 A1* | 2/2017 | Merz ................... G06Q 10/087 |

(Continued)

OTHER PUBLICATIONS

"Che, Binbin, 'Inter-Basket and Intra-Basket Adaptive Attention Network for Next Basket Recommendation', Jun. 14, 2019, IEEE Access, vol. 7" (Year: 2019).*

(Continued)

*Primary Examiner* — Marissa Thein
*Assistant Examiner* — Maria S. P. Heath
(74) *Attorney, Agent, or Firm* — Bryan Cave Leighton Paisner LLP

(57) ABSTRACT

Systems and methods including one or more processors and one or more non-transitory storage devices storing computing instructions configured to run on the one or more processors and perform acts of: generating a feature vector for a user based, at least in part, on historical data pertaining to the user's previous transactions; generating, using a quantity prediction model of a machine learning architecture, a respective item quantity prediction for each of one or more items included in a predicted basket based, at least in part, on the feature vector for the user; and populating a respective quantity selection option for each of the one or more items included in the predicted basket based on the respective item quantity prediction generated for each of the one or more items. Other embodiments are disclosed herein.

20 Claims, 9 Drawing Sheets

(56) References Cited

U.S. PATENT DOCUMENTS

2018/0150874 A1* 5/2018 Chen ................ G06Q 30/0254
2022/0058714 A1* 2/2022 Chen ........................ G06N 3/08

OTHER PUBLICATIONS

N. Tahiri, B. Mazoure, & V. Makarenkov, "An Intelligent Shopping List Based on the Application of Partitioning and Machine Learning Algorithms," Proc of the 18th Python in Science Conf. (SCIPY 2019), pp. 85-92 2019.
C. Liu, et al., "Machine Learning-Based e-Commerce Platform Repurchase Customer Predictin Model," PLoS One, 2020; 15(12); e0243105, https://www.ncbi.nlm.nih.gov/pmc/articles/PMC7714352/; 29 pgs Dec. 3, 2020.
A. Mazumdar, "Predicting Customer Purchase in an Online Retail Business, a Data Mining Approach," Nat'l Institute of Technology Rourkela, May 2010; 41 pgs May 2010.

\* cited by examiner

300

- 401 – Storage Module(s)
  - 330 – Electronic Platform
    - 410 – Database(s)
      - 370 – Historical Data
        - 375 – Transactions
        - 430 – Basket Features
      - 420 – Customer Features
      - 425 – Item Features
      - 310 – Items
        - 411 – Grocery Items
    - 360 – Digital Shopping Carts
      - 365 – Predicted Baskets
    - 350 – Machine Learning Architecture
      - 355 – Predictive Basket Functions
      - 440 – Feature Vectors
      - 450 – Basket Composition Models
        - 351 – Basket Size Predictions
        - 455 – Gradient Boosted Regression Models
        - 465 – Random Forest Decision Tree Models
        - 470 – Likelihood Scores
      - 460 – Quantity Prediction Models
        - 352 – Item Quantity Predictions
        - 455 – Gradient Boosted Regression Models
        - 465 – Random Forest Decision Tree Models

- 402 – Processing Module(s)

810– Generating a feature vector for a user based, at least in part, on historical data pertaining to the user's previous transactions 820– Generating likelihood scores for a plurality of items 830– Generating, using a basket composition model of the machine learning architecture, a basket size prediction for a predicted basket based, at least in part, on the feature vector for the user 840– Populating the predicted basket with one or more items based on the basket size prediction and the likelihood scores

910– Generating a feature vector for a user based, at least in part, on historical data pertaining to the users' previous transactions

920– Selecting one or more items to be included in a predictive basket for the user

930– Generating, using a quantity prediction model of the machine learning architecture, an item quantity prediction for each of the one or more items included in the predicted basket based, at least in part, on the feature vector for the user

940– Populating a quantity selection option for each of the one or more items included in the predicted basket based on the item quantity prediction generated for each of the one or more items

FIG. 9

SYSTEMS AND METHODS FOR GENERATING BASKET AND ITEM QUANTITY PREDICTIONS USING MACHINE LEARNING ARCHITECTURES

TECHNICAL FIELD

This disclosure relates generally to machine learning architectures that are configured to generate predictions related to predicted baskets. Exemplary predictions generated by the machine learning architectures include predictions pertaining to sizes of predicted baskets and quantities of each item included in the predicted baskets.

BACKGROUND

Electronic platforms permit users to browse, view, purchase, and/or order items. During a typical digital shopping experience, users may browse items, add items to a digital shopping cart, and purchase the items. The users also may select options for scheduling the items for pickup or delivery. For certain types of item categories (e.g., groceries), customers routinely place orders to restock or replenish items.

In some cases, electronic platform providers may desire to predict items to be included in shopping cart for a user's upcoming order. However, doing so is technically challenging for a variety of reasons. One technical challenge relates to accurately predicting a size or quantity of unique items that a user will desire to reorder in an upcoming transaction. Another technical challenge relates to accurately predicting a quantity of each individual item to be added to a digital shopping cart. The number of unique items and item quantities desired by the user can vary based on many different factors (e.g., whether the user recently placed one or more transactions, the number of items included in the one or more recent transactions, the quantities of items in the one or more recent transactions, the frequency at which the user places transactions, transient purchasing habits, etc.).

BRIEF DESCRIPTION OF THE DRAWINGS

To facilitate further description of the embodiments, the following drawings are provided in which:

FIG. 4 illustrates a representative block diagram of a portion of the system of FIG. 3 according to certain embodiments;

FIG. 8 illustrates an exemplary flow chart for a method according to certain embodiments; and FIG. 9 illustrates an exemplary flow chart for a method according to certain embodiments.

Figure 1:
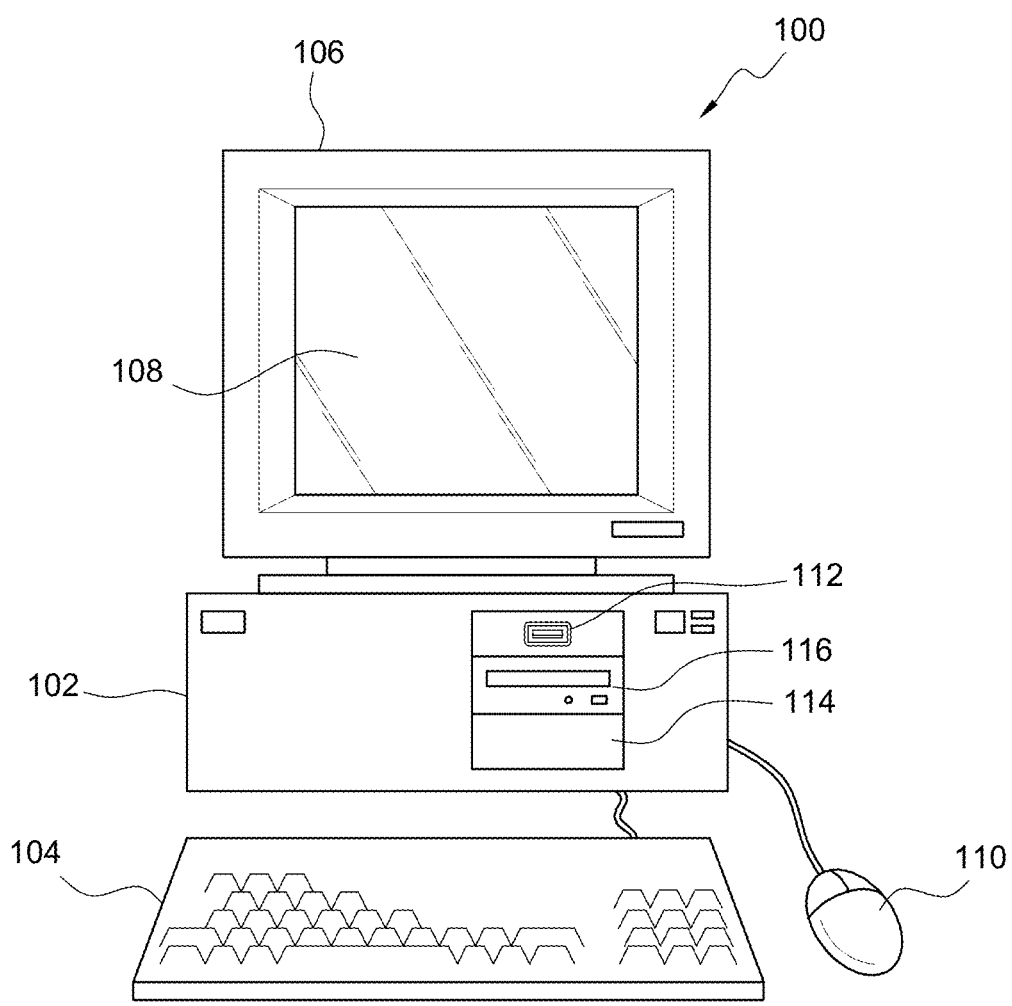
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform acts of: generating a feature vector for a user based, at least in part, on historical data pertaining to the user's previous transactions; selecting one or more items to be included in a predicted basket for the user; generating, using a quantity prediction model of a machine learning architecture, a respective item quantity prediction for each of the one or more items included in the predicted basket based, at least in part, on the feature vector for the user; and populating a respective quantity selection option for each of the one or more items included in the predicted basket based on the respective item quantity prediction generated for each of the one or more items.

Various embodiments include a method. The method can be implemented via execution of computing instructions configured to run at one or more processors and configured to be stored at non-transitory computer-readable media. The method can comprise: generating a feature vector for a user based, at least in part, on historical data pertaining to the user's previous transactions; selecting one or more items to be included in a predicted basket for the user; generating, using a quantity prediction model of a machine learning architecture, a respective item quantity prediction for each of the one or more items included in the predicted basket based, at least in part, on the feature vector for the user; and populating a respective quantity selection option for each of the one or more items included in the predicted basket based on the respective item quantity prediction generated for each of the one or more items.

The system can include one or more processors and one or more non-transitory computer-readable storage devices storing computing instructions. The computing instructions can be configured to run on the one or more processors and perform acts of: generating a feature vector for a user based, at least in part, on historical data pertaining to the user's previous transactions; generating likelihood scores for a plurality of items; generating, using a basket composition model of a machine learning architecture, a basket size prediction for a predicted basket based, at least in part, on the feature vector for the user, the basket size prediction indicating a number of items to be included in the predicted basket; and populating the predicted basket with one or more items, wherein the basket size prediction determines the number of the one or more items included in the predicted basket and the likelihood scores are utilized to select the one or more items from the plurality of items.

Another method can be implemented via execution of computing instructions configured to run at one or more processors and configured to be stored at non-transitory computer-readable media. The method can comprise: generating a feature vector for a user based, at least in part, on historical data pertaining to the user's previous transactions; generating likelihood scores for a plurality of items; generating, using a basket composition model of a machine learning architecture, a basket size prediction for a predicted basket based, at least in part, on the feature vector for the user, the basket size prediction indicating a number of items to be included in the predicted basket; and populating the predicted basket with one or more items, wherein the basket size prediction determines the number of the one or more items included in the predicted basket and the likelihood scores are utilized to select the one or more items from the plurality of items.

Figure 2:
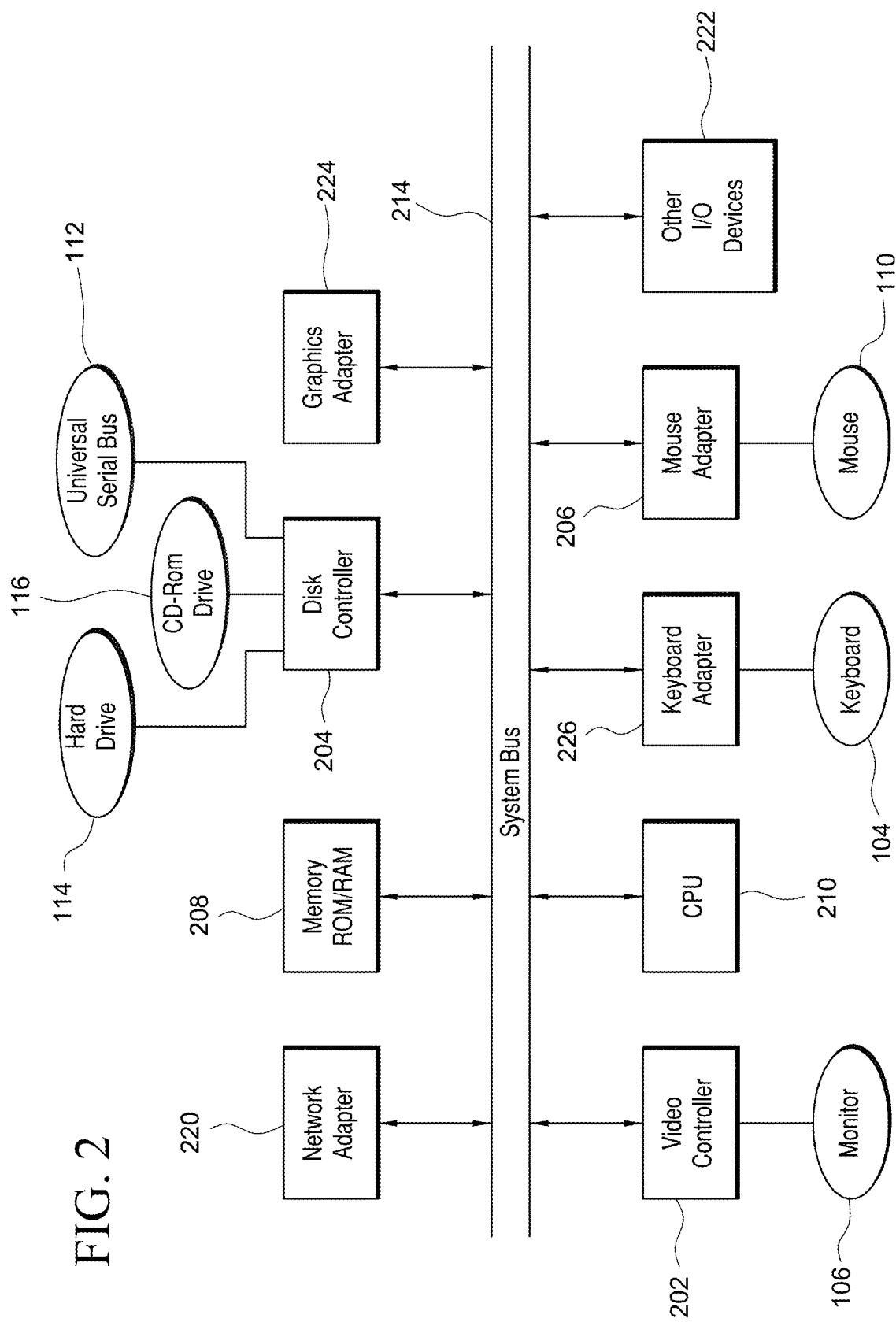
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
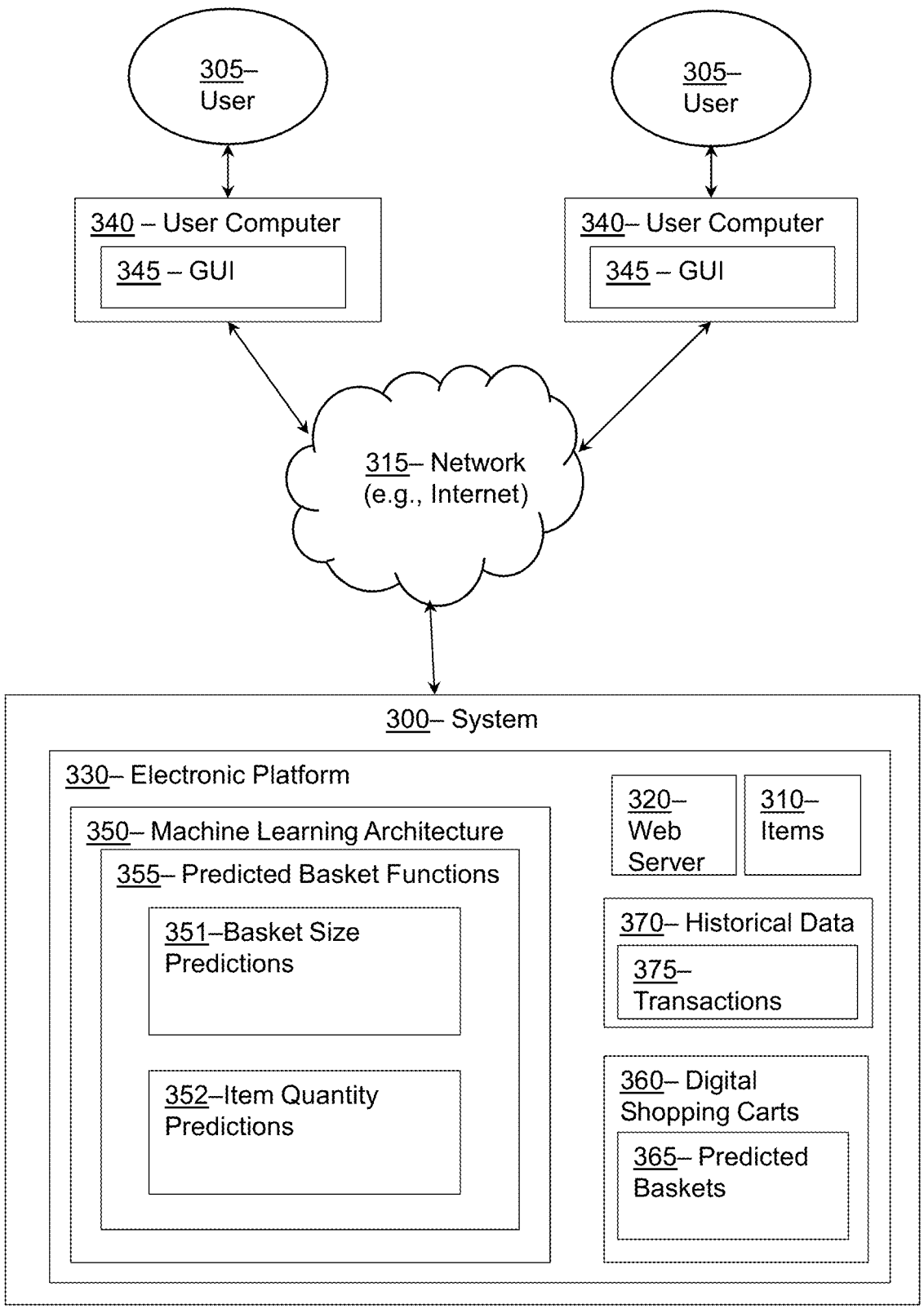
FIG. 3 illustrates a representative block diagram of a system according to certain embodiments.

Turning ahead in the drawings, FIG. 3 illustrates a block diagram of a system 300 that can be employed for generating predictions for predicted baskets, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 320, an electronic platform 330, and a machine learning architecture 350. Web server 320, electronic platform 330, and machine learning architecture 350 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 320, electronic platform 330, and machine learning architecture 350. Additional details regarding web server 320, electronic platform 330, and machine learning architecture 350 are described herein.

In many embodiments, system 300 also can comprise user computers 340. User computers 340 can comprise any of the elements described in relation to computer system 100. In some embodiments, user computers 340 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, system 300 can comprise graphical user interfaces ("GUIs") 345. In the same or different embodiments, GUIs 345 can be part of and/or displayed by computing devices associated with system 300 and/or user computers 340, which also can be part of system 300. In some embodiments, GUIs 345 can comprise text and/or graphics (images) based user interfaces. In the same or different embodiments, GUIs 345 can comprise a heads up display ("HUD"). When GUIs 345 comprise a HUD, GUIs 345 can be projected onto glass or plastic, displayed in midair as a hologram, or displayed on monitor 106 (FIG. 1). In various embodiments, GUIs 345 can be color or black and white. In many embodiments, GUIs 345 can comprise an application running on a computer system, such as computer system 100, user computers 340, and/or server computer 310. In the same or different embodiments, GUI 345 can comprise a website accessed through network 315 (e.g., the Internet). In some embodiments, GUI 345 can comprise an eCommerce website. In the same or different embodiments, GUI 345 can be displayed as or on a virtual reality (VR) and/or augmented reality (AR) system or display.

In some embodiments, web server 320 can be in data communication through network 315 (e.g., the Internet) with user computers (e.g., 340). In certain embodiments, the network 315 may represent any type of communication network, e.g., such as one that comprises the Internet, a local area network (e.g., a Wi-Fi network), a personal area network (e.g., a Bluetooth network), a wide area network, an intranet, a cellular network, a television network, and/or other types of networks. In certain embodiments, user computers 340 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, web server 320, electronic platform 330, and machine learning architecture 350 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) web server 320, electronic platform 330, and machine learning architecture 350 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 320, electronic platform 330, and machine learning architecture 350. In a similar manner, the processing module(s) and the memory storage module(s) can be local and/or remote to each other.

In many embodiments, web server 320, electronic platform 330, and machine learning architecture 350 can be configured to communicate with one or more user computers 340. In some embodiments, user computers 340 also can be referred to as customer computers. In some embodiments, web server 320, electronic platform 330, and machine learning architecture 350 can communicate or interface (e.g., interact) with one or more customer computers (such as user computers 340) through a network 315 (e.g., the Internet). Network 315 can be an intranet that is not open to the public. Accordingly, in many embodiments, web server 320, electronic platform 330, and machine learning architecture 350 (and/or the software used by such systems) can refer to a back end of system 300 operated by an operator and/or administrator of system 300, and user computers 340 (and/or the software used by such systems) can refer to a front end of system 300 used by one or more users 305, respectively. In some embodiments, users 305 can also be referred to as customers, in which case, user computers 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 320, electronic platform 330, and machine learning architecture 350 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between or among web server 320, electronic platform 330, and machine learning architecture 350, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In certain embodiments, users 305 may operate user computers 340 to browse, view, purchase, and/or order items 310 via the electronic platform 330. For example, the electronic platform 330 may include an eCommerce website that enables users 305 to access interfaces (e.g., GUIs 345) that display details about items 310, add items 310 to a digital shopping cart 360, and purchase the added items 310. The items 310 made available via the electronic platform 330 may generally relate to any type of product and/or service including, but not limited to, products and/or services associated with groceries, household items, entertainment, furniture, apparel, kitchenware, fashion, appliances, sporting goods, electronics, software, etc.

The electronic platform 330 can be configured to generate predicted baskets 365 for the digital shopping cart 360. A predicted basket 365 can represent, or include, one or more items 310 that are presented or suggested to a user 305 for an upcoming transaction 375 based on predictions generated by the machine learning architecture 350. The predicted baskets 365 can be displayed on GUIs 345 that display the suggested items 310, and the GUIs 345 may include an option (e.g., a selectable GUI button) that permits the user 305 to quickly and easily add the suggested items 310 to a digital shopping cart 360. The predicted baskets 365 also can include options that permit users to modify the contents of the predicted baskets (e.g., to increase and decrease quantities of items 310 and/or to remove items 310 from the predicted baskets 365.

To generate the predicted baskets 365, the machine learning architecture 350 can be configured to learn user transaction patterns and select the one or more items 310 to be added to the predicted basket 365 based, at least in part, on the learned user transaction patterns. The manner in which the machine learning architecture 350 is trained to learn the user transaction patterns may vary. Exemplary techniques are described in further detail below.

Amongst other things, the predicted baskets 365 enable users 305 to easily restock or repurchase items 310. In certain embodiments, a predicted basket 365 can be pre-filled and/or automatically populated with items 310 (and appropriate quantities for each item) without requiring a user to manually select the items 310, and the user can easily add the items 310 to a digital shopping cart by selecting a GUI option (e.g., an "Add all to cart") in a single mouse click and/or single tap gesture. The number of unique items 310 added the predicted basket 365, as well as the quantity of each item 310, can be personalized to each user based, at least in part, on user transaction patterns learned by the machine learning architecture 350. This maximizes the probability of the users 305 accepting the proposed items 310 and respective predicted quantities, and improves customer engagement and retention on the electronic platform 330. Additionally, these techniques also minimize the time and efforts users' 305 spend building a digital shopping cart 360, and permit easy reordering of items 310.

The machine learning architecture 350 can be configured to execute various predicted basket functions 355 that assist with generating or creating predicted baskets 365. Exemplary predicted basket functions 355 can include functions for selecting items 310 to be included in the predicted baskets 365. In certain embodiments, the machine learning architecture 350 can generate the predicted baskets 365 and select items 310 to be included in the predicted baskets 365 using the techniques described in U.S. patent application Ser. No. 16/779,254 filed on Jan. 31, 2020, which is herein incorporated by reference in its entirety.

The machine learning architecture 350 also can be configured to execute predicted basket functions 355 related to generating basket size predictions 351, item quantity predictions 352, and/or other types of predictions. The basket size predictions 351 can include or indicate a number of unique items 310 to be included in the predicted basket 365. The item quantity predictions 352 can include or indicate a quantity for each of the items 310 included in the predicted basket 365.

In certain embodiments, the machine learning architecture 350 generates these and other predictions based on an analysis of historical data 370 for the users 305. For example, the electronic platform 330 can be configured to store historical data 370, which records some or all activities involving users' 305 interactions with electronic platform 330 and/or interactions with items 310 offered through the electronic platform 330.

In certain embodiments, the historical data 370 stored for each user 305 can include information related to transactions 375 conducted by each of the users 305. Each transaction 375 can relate to a previous order in which one or more items 310 were purchased by a user 305 through either an online channel (e.g., via the electronic platform 330) or an offline channel (e.g., at a brick-and-mortar location). For example, a typical transaction 375 may involve a user 305 purchasing one or more items 310 via the electronic platform 330 or offline channel, and scheduling the one or more items 310 for pick-up or delivery. In certain embodiments, the transactions 375 conducted by each user 305, and all historical data 370 recorded for the user 305, can be associated with a profile associated with the user 305.

For each user 305, the historical data 370 can include detailed information related to each transaction 375 initiated by the user 305. For example, the electronic platform 330 may store any or all of the following information for each transaction 375 conducted by a user 305: any items 310 that were included in the transaction 375 and/or purchased in connection with the transactions 375; the total number of transactions 375 placed by each user 305; the date and/or time each transaction 375 was scheduled on the electronic platform 330; the total monetary value of each transaction 375 and/or the sale price of each item 310 included in each of the transaction 375; the basket size of each transaction 375; the rate at which each user 305 places transactions 375; whether the user selected a pick-up and/or delivery option for the transaction 375; and/or a time slot that was selected for pick-up and/or delivery option.

The historical data 370 also may include, or be used to derive, other metrics which indicate: how recently each of the items 310 were purchased; transient item quantity selections (e.g., which may vary due to changing family size, an occurrence of a pandemic, etc.); whether users 305 are loyal to particular brands; whether users 305 are willing to order alternative items 310 in the same item type category (e.g., due to inventory shortages); whether users 305 tend to order various items in the same item type category (e.g., to test new items or brands); user purchase frequency for each of the items 310 via an online or electronic channel; user purchase frequency for each of the items 310 via offline or brick-and-mortar channels; units of measurements for purchased items 310 (e.g., indicating the sizes of items in terms of ounces, fluid ounces, grams, etc.); customer's item purchase quantity patterns; item inter-purchase intervals (IPI) (e.g., indicating the mean and/or median time between purchases for each of the items 310); perishability indices associated with purchased items 310; and/or other related factors.

As explained in further detail below, the machine learning architecture 350 can extract various features from the historical data 370 to generate feature vectors for the users 305. A plurality of features vectors (e.g., thousands or millions) can be utilized to train the machine learning architecture 350 to generate the basket size predictions 351, item quantity predictions 352, and/or other types of predictions. During inference, a feature vector for a user 305 can be received by the machine learning architecture 350 to generate the predictions for user 305 with accuracy and in a manner that personalizes the predicted baskets for the user 305.

The configuration of the machine learning architecture 350 can vary. In certain embodiments, the machine learning architecture 350 can include one or more machine learning models and/or artificial neural networks that are configured to execute deep learning functions, artificial intelligence (AI) functions, and/or machine learning functions to generate the predictions and perform the functions described herein.

As described in further detail below, in certain embodiments, the machine learning architecture 350 can utilize one or more random forest decision tree models and/or one or more gradient boosted regression models that are trained to learn the user transaction patterns and generate the basket size predictions 351, item quantity predictions 352, and/or other types of predictions. For example, in certain configurations, the machine learning architecture 350 may execute one or more gradient boosted regression models to generate the basket size predictions 351 and one or more random forest decision tree models to generate the item quantity predictions 352. Exemplary configurations for the random forest decision tree models and gradient boosted regression models are described in further detail below. Other types of machine learning models also can be utilized by the machine learning architecture 350 to perform the functions described in this disclosure.

The machine learning architecture 350 and/or electronic platform 330 can perform the functions described herein (e.g., related to generating predicted baskets 365, basket size predictions 351, item quantity predictions 352, etc.) for any of the users 305. In certain embodiments, these functions are only provided to users 305 who are active customers and/or routinely utilize the electronic platform 330 to place transactions 375. For example, in certain embodiments, the machine learning architecture 350 (or other component of the system 300) may initially analyze the historical data 370 to identify a subset of users who routinely and/or regularly utilize the electronic platform 330, and/or who routinely and/or regularly conduct transactions 375 for particular types of items (e.g. groceries and/or household items). The machine learning architecture 350 can generate the predictions for this subset of users.

The techniques described herein for generating predicted baskets 365, basket size predictions 351, and/or item quantity predictions 352 can be utilized to facilitate repurchasing of any type of item 310 (e.g., items 310 relating to furniture, apparel, kitchenware, fashion, appliances, sporting goods, electronics, software, and/or other types of items 310). In certain embodiments, these techniques may be particularly useful in connection with facilitating the repurchases of items 310 that are routinely ordered and/or restocked by users 305, such as groceries and household items (e.g., paper towels, tissues, toilet paper, toiletries, etc.).

The machine learning architecture 350 can utilize technical improvements in machine learning technologies to optimize the predicted baskets 365, basket size predictions 351, and/or item quantity predictions 352 in a manner that increases both satisfaction of users 305 (e.g., by selecting optimal basket sizes and quantities of items 310 to facilitate quick and easy repurchasing of items 310) and providers of the electronic platform 330 (e.g., by ensuring customer retention, preventing lost sales, and increasing repurchase rates). For example, in certain embodiments, the machine learning architecture 350 may enhance the generation of the predicted baskets 365, basket size predictions 351, and/or item quantity predictions 352 by learning user transaction patterns from the historical data 370. The learned user transaction patterns can then be used to accurately predict the items 310 included in the predicted baskets 365, the sizes of the predicted baskets 365, and the quantities of each item 310 included in the baskets.

FIG. 4 is a block diagram illustrating a detailed view of an exemplary system 300 in accordance with certain embodiments. The system 300 includes one or more storage modules 401 that are in communication with one or more processing modules 402. The one or more storage modules 401 can include: (i) non-volatile memory, such as, for example, read-only memory (ROM) or programmable read-only memory (PROM); and/or (ii) volatile memory, such as, for example, random access memory (RAM), dynamic RAM (DRAM), static RAM (SRAM), etc. In these or other embodiments, storage modules 401 can comprise (i) non-transitory memory and/or (ii) transitory memory. The one or more processing modules 402 can include one or more central processing units (CPUs), graphical processing units (GPUs), controllers, microprocessors, digital signal processors, and/or computational circuits. The one or more storage modules 401 can store data and instructions associated with providing an electronic platform 330, machine learning architecture 350 (and associated sub-components), and digital shopping carts 365. The one or more processing modules 402 can be configured to execute any and all instructions associated with implementing the functions performed by these components. Exemplary configurations for each of these components are described in further detail below.

The exemplary electronic platform 330 of system 300 includes one or more databases 410. The one or more databases 410 store data and information related to items 310 (e.g., products and/or services) that are offered or made available via the electronic platform 330. For example, for each item 310, data associated with the item 310 can include any or all of the following: an item name or title, an item category associated with the item, a price, one or more customer ratings for the item, an item description, images corresponding to the item, a number of total sales, and various other data associated with the item. In some embodiments, the items 310 may pertain to grocery items 411 (e.g., such as food, drinks, edible products, etc.).

The one or more databases 410 also may store the historical data 370 which, as mentioned above, can include any data associated with transactions 375 conducted by the users 305. In certain embodiments, the historical data 370 may store, or may be used to derive, one or more customer features 420, one or more item features 425, and/or one or more basket features 430. The customer features 420 can include descriptors pertaining to the users' 305 interactivity with the electronic platform 330 and/or items 310, as well as transactions patterns associated with the users 305. The basket features 430 can include descriptors pertaining to the contents of baskets or digital shopping carts 360 purchased in connection with the transactions 375 and/or items 310 included in the baskets or digital shopping carts 360. The item features 425 can include descriptors pertaining to the items 310.

For each user 305, exemplary customer features 420 can include any or all of the following: a total number of transactions 375 placed by the user 305; how frequently the user 305 places transactions via the electronic platform 330 (e.g., whether the user 305 has a high engagement level with the electronic platform 330); a typical basket size for transactions 375 placed by the user 305 (e.g., an average or medium basket size of the user); a minimum basket size for transactions 375 placed by the user 305; a maximum basket size for transactions 375 placed by the user 305; a user IPI (e.g., indicating the mean and/or median time between transactions 375 placed by the user); a transaction or ordering rate for the user (e.g., indicating how frequently the user places transactions 375 for online transactions and/or offline transactions); an item ordering rate (e.g., indicating how frequently the user 305 purchases each item 310); a time period that has lapsed since the user placed a most recent transaction 375; and/or other metrics associated with the user 305.

For each user 305, exemplary basket features 430 can include any or all of the following: how recently the user 305 placed a transaction 310; how recently the user 305 purchased each item 310; a total number of items 310 ordered on the electronic platform 330; a total number of unique items 310 ordered on the electronic platform 330; a total number and/or percentage of items 310 repurchased on the electronic platform 330; a diversity index indicating how heterogeneous a basket is (e.g., a basket containing multiple quantities of the same/similar items has low item diversity); and/or other metrics related to the composition of baskets and/or digital shopping carts 360 or transactions 375 placed on the electronic platform 330.

Exemplary item features 425 can include any or all of the following: units of measurement associated with items 310 (e.g., indicating sizes, weights, ounces, etc. of the items 310); organic indices associated with item 310 (e.g., indicating whether or not the item is organic); perishability indices associated with items (e.g., indicating whether or not items are perishable and/or the level of perishability of the items 310); value pack indicators (e.g., indicating whether or not the item comprises a bundle of sub-items and/or how many sub-items are included in the item); prices or purchase values for the items 310; and/or other metrics related to the items 310.

The historical data 370 (including the customer features 420, item features 425, and basket features 430) can be derived from both online transactions (e.g., transactions 375 conducted on the electronic platform 330 and/or over a network 315) and offline transactions (e.g., transactions conducted at physical, brick-and-mortar locations). This allows the machine learning architecture 350 to assess comprehensive information for historical customer and purchase patterns, which can help to improve the accuracy of the predictions made by the machine learning architecture 350.

The machine learning architecture 350 may generate feature vectors 440 based on the historical data 370, including the customer features 420, item features 425, and/or basket features 430. Each feature vector 440 may represent a one-dimensional vector and/or multi-dimensional vector. A plurality of feature vectors 440 can initially be used to train the machine learning models (e.g., one or more gradient boosted regression models 455 and/or one or more random forest decision tree models 465). During inference, a feature vector 440 specific to each user can be used to generate the basket size prediction 351 and item quantity prediction 352 for the user. The feature vectors 440 used to generate the basket size predictions 351 and item quantity predictions 352 can include different features as described below.

In certain embodiments, the machine learning architecture 350 includes one or more basket composition models 450 that are configured to generate the basket size predictions 351. The basket composition models 450 can account for a multitude of factors in selecting the number of repurchase items 310 to be included in a predicted basket 365. For example, the basket size predictions 351 generated by the one or more basket composition models 450 can be personalized for each user based on how recently the user placed a transaction 375, the user's item inter-purchase interval (e.g., the time between transactions conducted for the same items 310 or category of items 310), whether the items were previously selected for repurchase, the price and size of the user's last transaction 375 or basket, and/or other factors. For example, a user who recently repurchased a large quantity of items is likely to repurchase less items in the subsequent transaction. The basket composition models 450 can be trained to predict the optimum number of items 310 to include in a predicted basket 365 by accounting for these and other factors.

In certain embodiments, the basket composition model 450 can include one or more gradient boosted regression models 455 and/or one or more random forest decision tree models 465 that are configured to generate the basket size predictions 351. Other learning models also may be utilized to generate the basket size predictions 351. In certain embodiments, the gradient boosted regression models 455 can be trained and evaluated on a historical data 370 for a previous time period (e.g., previous thirteen months of transactions) for thousands or millions of users.

Exemplary configurations for the gradient boosted regression model 455 are described below. In some scenarios, the basket composition model 450 may include a pair of separately trained gradient boosted regression models 455. One of the gradient boosted regression models 455 can be configured to generate a repurchase basket size RBS value that represents the basket size prediction 351 for a user 305. The repurchase basket size RBS can be used to select the number of unique items 310 included in the predicted basket 365.

The other gradient boosted regression model 455 can be configured to generate a basket size BS value, that represents the number of unique items in a basket. This includes repurchase basket size RBS, which is a number of unique items 310 included in the predicted basket 365, plus a number of additional unique items, newly purchased by a user 305. Basket size BS can be used to recommend new items to a user 305 outside of the predicted baskets 365.

The relationship between value BS and value RBS is explained in the following example. For example, take the case of a user who buys the following items: [chocolate_10, chocolate_10, milk_1, milk_1, eggs_1], where _num is identifier of an item type. Hypothetically, if the user has milk_1, eggs_1 in their purchase history, the user's repurchase basket size RBS would equal 2 (milk_1, eggs_1), and the user's basket size BS, which is a sum of repurchase basket size RBS (2) and the new unique item count (chocolate_10) would be equal to 3.

Given a user's features X (e.g. the feature vector 440 extracted from user's historical data 370 for both online and offline transactions 375), the two gradient boosted regression models 455 can be configured to predict RBS and BS values, respectively. The gradient boosted regression models 455 can be constructed as an ensemble of K weak regressors, and can be implemented with decision trees. Prediction of individual tree i can be computed given input X, by making a sequence of decisions based on the tree structure and values in X, until a leaf node is reached. Each leaf node in a tree i, corresponding to X, includes the mean of labels from the training samples which belong to that leaf, and this is the value $\hat{y}_i$. Using Equation 1 below, the gradient boosted regression models 455 can output continuous value $\hat{Y}$ which is an average over the predictions of the individual trees:

$$\hat{Y} = \frac{\sum_{i=1}^{K} \hat{y}_i}{K}. \quad (1)$$

Gradient boosted regression models 455 can be configured to generate 98% confidence intervals (CIs) for RBS and BS. Confidence intervals for RBS can be used to determine how conservative a value RBS from the gradient boosted regression models 455 will be applied in the selection of unique items 310 to be included in the predicted basket 365. For example, broad CIs indicate lower confidence in the generated RBS value, which might subsequently be used to decrease the number of items included in the predicted basket 365.

In other embodiments, one or more random forest decision tree models 465 may be utilized to generate the repurchase basket size RBS and basket size BS values. Exemplary details for random forest decision tree models 465 are described in further detail below in connection with the quantity prediction models 460.

The particular feature vectors 440 utilized by the learning models of the basket composition model 450 for training and inference can vary. In certain embodiments, the learning models associated with the basket composition model 450 can receive a feature vector 440 that comprises some or all of the customer features and/or basket features described herein. Other features also may be included in the feature vectors 440.

Figure 6:
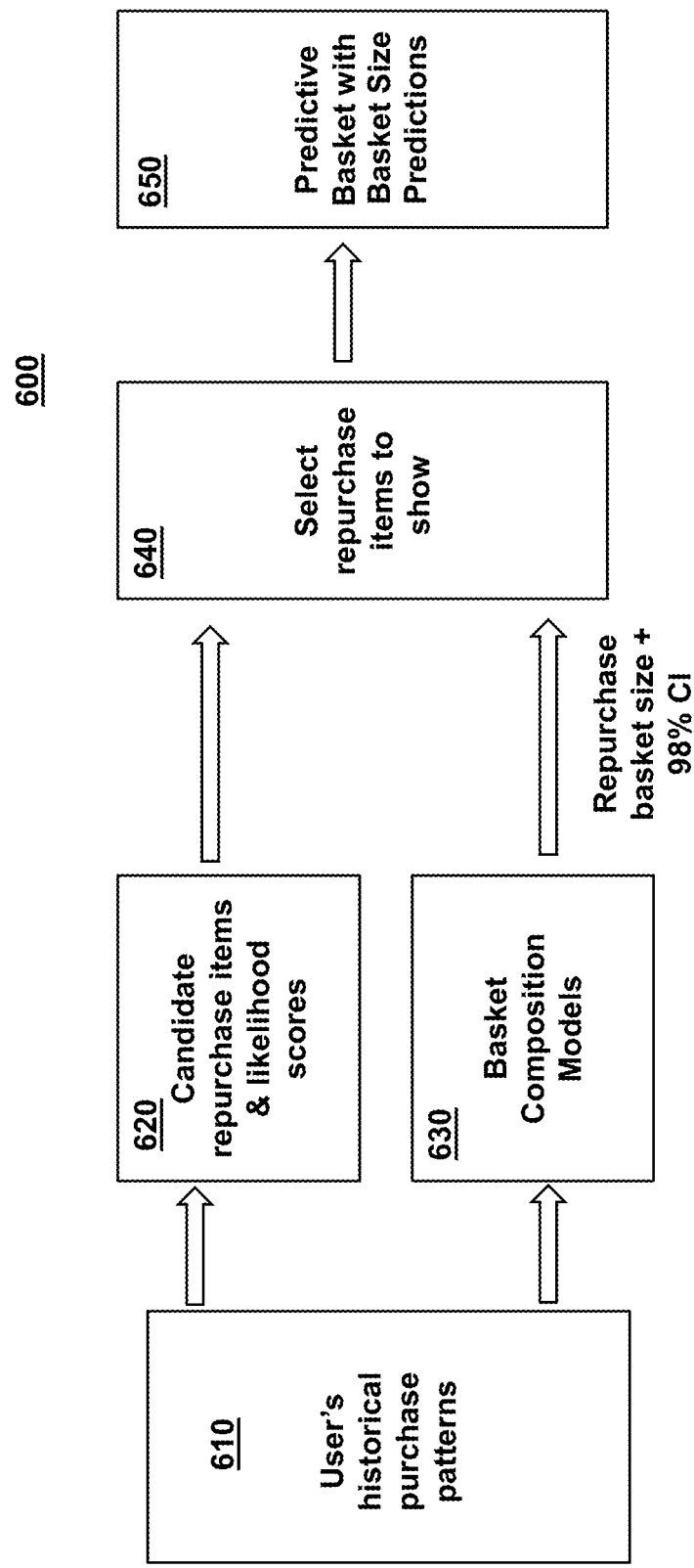
FIG. 6 illustrates an exemplary flow diagram according to certain embodiments.

FIG. 6 is a flow diagram illustrating exemplary operations that may be executed by the machine learning architecture 350 to generate a predicted basket for a user according to certain embodiments.

In block 610, a user's historical purchase patterns are received by the machine learning architecture. As mentioned above, the user's historical purchase patterns can be extracted from the historical data (FIGS. 3-4) and features related to the purchase patterns may be incorporated into a feature vector 440 (FIG. 4) for the user.

In block 620, the machine learning architecture 350 utilizes the historical purchase patterns and/or feature vector 440 (FIG. 4) to generate a list of candidate repurchase items and likelihood scores 470 (FIG. 4) for each of the candidate repurchase items. The likelihood score 470 (FIG. 4) for each item indicates a likelihood or probability that the user will repurchase the item for the predicted basket being generated. In certain embodiments, each likelihood score 470 (FIG. 4) may represent a value between 0 and 1, where scores closer to 1 indicate a higher probability of repurchasing the item and scores closer to 0 indicate a lower probability of repurchasing the item. In certain embodiments, the likelihood scores 470 (FIG. 4) can be generated using the techniques described in U.S. patent application Ser. No. 16/779,254 filed on Jan. 31, 2020 (which, as mentioned above, is incorporated by reference in its entirety). After the likelihood scores 470 (FIG. 4) are generated, the candidate repurchase items may be ordered from highest to lowest based on the likelihood scores 470 (FIG. 4) associated with the items.

In block 630, the machine learning architecture 350 executes a basket composition model 450 (FIG. 4), by, among other things, utilizing the historical purchase patterns and/or feature vector 440 (FIG. 4), to generate a basket size prediction 351 (FIGS. 3-4) for the predicted basket. As mentioned above, the basket composition model 450 may include one or more gradient boosted regression models 455 (FIG. 4) and/or one or more random forest decision tree models 465 (FIG. 4). The basket composition model 450 outputs the basket size prediction RBS 351 (FIGS. 3-4), which indicates how many unique items are to be included in the predicted basket. In some cases, the basket composition model 450 also may output the basket size BS value which can be used to recommend new items to the user.

In block 640, the items to be included in the predicted basket are selected. In certain embodiments, the basket size prediction 351 (FIGS. 3-4) generated in block 630 indicates a number of items N, which may be RBS or RBS adjusted based on predictions of confidence intervals, to be selected, and the top N candidate repurchase items from block 620 (which can be ordered based on the likelihood scores 470 (FIG. 4)) are selected for inclusion in the predicted basket.

In block 650, the predicted basket from block 640 is displayed to the user on a GUI and includes the selected repurchase items. The number of unique repurchase items included in the predicted basket corresponds to the number of items indicated by the basket size prediction 351 (FIGS. 3-4).

Returning to FIG. 4, the machine learning architecture 350 includes one or more quantity prediction models 460 that are configured to generate the item quantity predictions 352. For example, for each item 310 that is included in the predicted basket 365, the quantity prediction model 460 determines or predicts the desired quantity for the item 310 and a GUI that displays the predicted basket to a user will be auto-populated to include the predicted quantity.

Accurately predicting the purchase quantities desired by a user for items 310 included in a predicted basket 365 can be technically challenging because the quantity prediction model 460 may need to account for various factors that can alter the desired quantity of an item. For example, in certain embodiments, the quantity desired by the user may vary based on factors including: 1) how recently the item was purchased by the user (e.g., the user may wish to purchase a smaller quantity if the user recently purchased the item in a previous transaction); 2) the unit of measurement for the item (e.g., a user may desire a single item if the item is available in a large size or may desire multiple items if the item is a smaller size); 3) whether the item is an individual item or sold as a value pack that includes a bundle of multiple sub-items; 4) transient quantity preferences (e.g., a user may desire a larger quantity of items in times of a pandemic, holiday trends, or increased family size); and/or 5) inventory availability (e.g., a user may be willing to accept alternative brands if a preferred brand is not available, but the user may desire lower quantities of the alterative brand). In certain embodiments, the quantity prediction model 460 can be trained to account for these and other factors that affect the quantities desired by a user in order to accurately generate the item quantity predictions 352.

In certain embodiments, the quantity prediction model 460 can be configured to create a probability distribution of a user's previous item-specific purchase quantities and utilize the purchase quantity information as a prior to predict the purchase quantity for the user's next transaction. Because the predicted items and corresponding quantities are personalized, there is a high probability of the customer accepting all the proposed items and their respective quantities in a single click (or tap gesture). Moreover, this can serve to improve customer engagement and increase customer retention.

In certain embodiments, the quantity prediction model 460 can include one or more random forest decision tree models 465 and/or one or more gradient boosted regression models 455 that are configured to generate the item quantity predictions 352. Exemplary configurations of these models are described below. Other learning models also may be utilized to generate the item quantity predictions 352.

In certain embodiments, the quantity prediction model 460 utilizes a random forest decision tree model 465 to generate the item quantity predictions 352. The problem to predict the purchase quantity for each item 310 given the feature vector for a user can be modeled via regression using a random forest regression technique. The random forest decision tree model 465 can represent a machine learning model that is built using an ensemble of B weak regressors. In this case, the B weak regressors can be configured to output a continuous value. The prediction for a new sample X (e.g., a feature vector 440 containing features extracted from the historical data 370 for a user) can be obtained by averaging the predictions from the B trees.

$$y < -f(X) = \frac{1}{B}\sum_{b=1}^{B} f_b(X) \quad (2)$$

wherein:
y=prediction for new sample X;
f(x)=prediction for new sample X;
$f_b$(x)=prediction for new sample X from each individual tree/regressor;
B=number of trees/regressors; and
b=each tree/regressor from the B number of trees.

Alternatively, or additionally, the quantity prediction model 460 can utilize a gradient boosted regression model 455 to generate the item quantity predictions 352. As explained above, the gradient boosted regression model 455 can include an ensemble of weak regressors. During training, the gradient boosted regression model 455 can receive the feature vectors 440 and corresponding labels y, and learn a sequence of K decision trees via a boosting method. The parameters of the gradient boosted regression model 455, which include tree depth and number K can be declared at the beginning of the training process. During inference, prediction 9 of each individual tree i in ensemble of size K is computed given input vector. A leaf corresponding to the input vector includes the mean of labels from the training samples that belong to leaf 9, which is a subset of y. Equation 1 (above) can be used to compute these values and generate the item quantity prediction 352.

The particular feature vectors 440 utilized by the learning models of the quantity prediction model 460 for training and inference can vary. In certain embodiments, the learning models associated with the quantity prediction model 460 can receive a feature vector 440 for each user that comprises the customer features and/or items features described herein. Other features also may be included in the feature vectors 440 in certain embodiments.

In certain embodiments, the learning models of the quantity prediction model 460 can been trained on several months of purchase histories from thousands or millions of users and evaluated on the purchases of the same users in the following two-week period.

Figure 7:
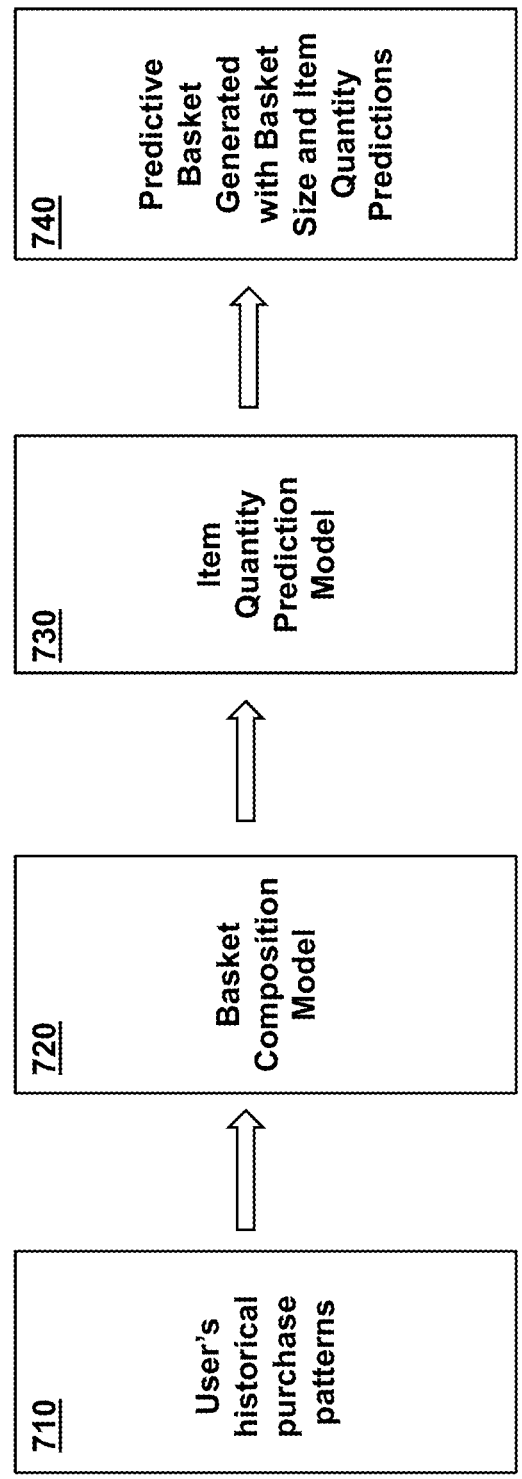
FIG. 7 illustrates an exemplary flow diagram according to certain embodiments.

FIG. 7 is a flow diagram illustrating exemplary operations that may be executed by the machine learning architecture to generate a predicted basket for a user according to certain embodiments.

In block 710, a user's historical purchase patterns are received by the machine learning architecture. As mentioned above, the user's historical purchase patterns can be extracted from the historical data 370 (FIGS. 3-4) and features related to the purchase patterns may be incorporated into a feature vector 440 (FIG. 4) for the user.

In block 720, a basket composition model 450 (FIG. 4) is configured from the user's historical purchase patterns of block 710 to generate a basket size prediction 351 (FIGS. 3-4) that determines the size and/or number of unique items included in the predicted basket for the user.

In block 730, a quantity prediction model 460 (FIG. 4) is configured from the user's historical purchase patterns of block 710 to generate an item quantity prediction 352 (FIGS. 3-4) for each item included in the predicted basket. The item quantity prediction 352 determines the number or quantity of each item to be included in the predicted basket for the user.

In block 740, the predicted basket is generated based on the basket size prediction 351 (FIGS. 3-4) and item quantity prediction 352 (FIGS. 3-4) of blocks 720 and 730, respectively. The predicted basket can be displayed on a GUI to the user.

Figure 5:
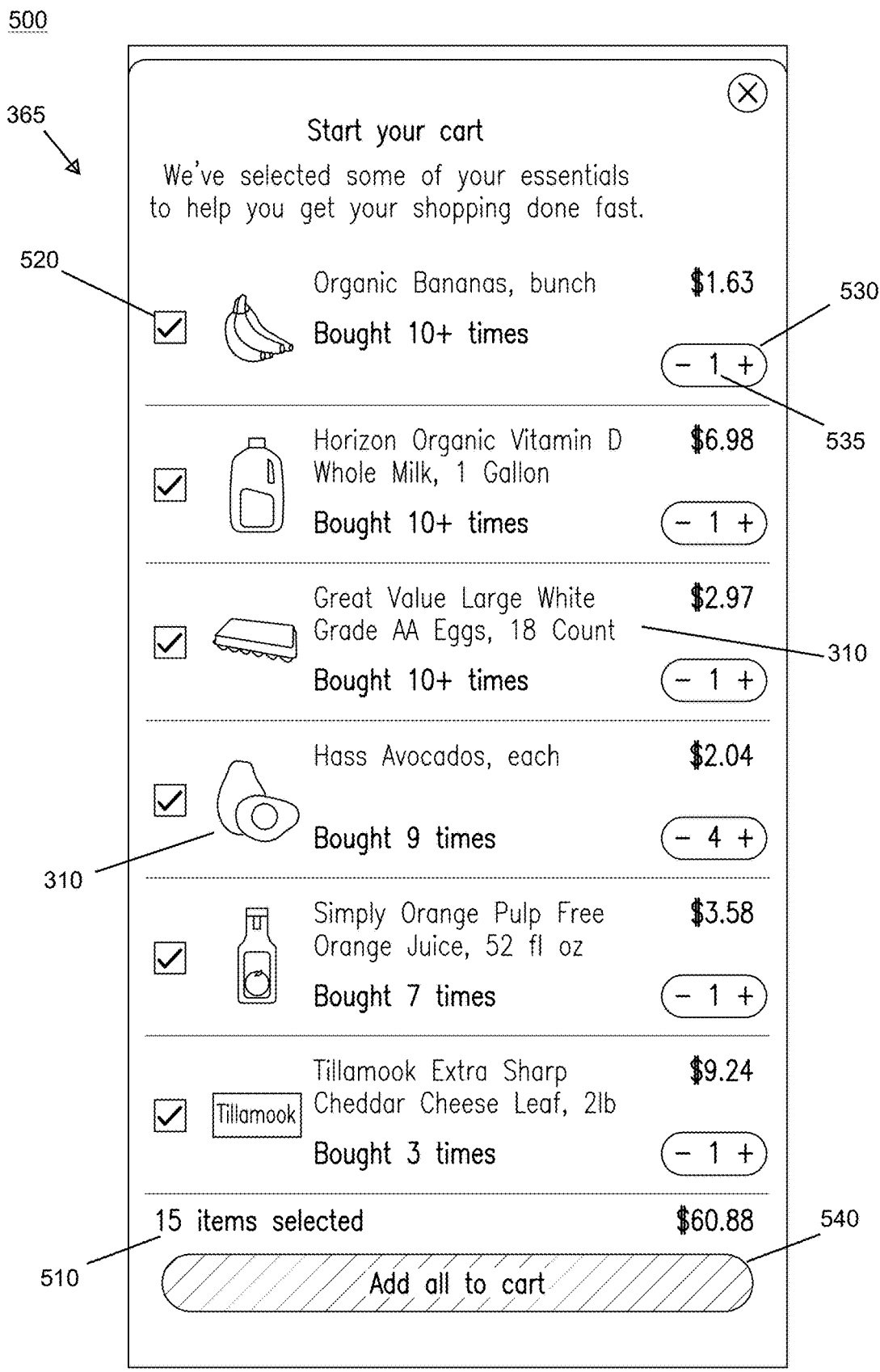
FIG. 5 illustrates an exemplary interface according to certain embodiments.

FIG. 5 is an exemplary interface 500 that may be generated and displayed in connection with providing a predicted basket to a user. The interface 500 displays a listing of items 310 that have been automatically selected by the machine learning architecture based on the predicted preferences of a user.

The interface includes a basket size indicator 510 specifying the size of the predicted basket 365 and/or the number of unique items included in the predicted basket 365. In this example, the predicted basket includes fifteen items (not all items are shown, but the user may scroll to view all of the other items). The basket size indicator 510 (and number of unique items included in the predicted basket 365) are based on the basket size prediction 351 (FIGS. 3-4) generated by the machine learning architecture (e.g., the basket composition model).

Each item 310 includes an option 520 that can be manipulated to specify whether the user wants to include or exclude the item 310 from the predicted basket 365. In certain embodiments, the options 520 are pre-selected by default to enable the items 310 to be quickly added to a digital shopping cart 360. A user can unselect any items he or she wishes to exclude.

Each item 310 also includes a quantity indicator 530 that indicates the predicted quantity 535 of each item 310 included in the predicted basket 365. In this example, all of the predicted quantities 535 are set to one, expect for one of the items which is set to four. The quantity indicators 530 displayed on the interface are based on the item quantity predictions 352 (FIGS. 3-4) generated by the machine learning architecture (e.g., the quantity prediction model). If desired, a user can select the "+" and "−" options on the quantity indicators 530 to increase or decrease the quantities of the items 310.

After a user is satisfied with the contents of the predicted basket 365, the user can select a submission option 540 (labeled "Add all to cart") and all of the selected items 310 will be added to the user's digital shopping cart 360. The basket size prediction and item quantity predictions used to generate the predicted basket 365 serve to minimize the user interaction related to selecting and/or reordering the items 310. In many cases, these predictions permit users to fill their digital shopping carts quickly and easily with desired items using a single step (e.g., by selecting a single submission option or other option to add the items to the digital shopping cart).

FIG. 8 illustrates a flow chart for an exemplary method 800, according to certain embodiments. Method 800 is merely exemplary and is not limited to the embodiments presented herein. Method 800 can be employed in many different embodiments or examples not specifically depicted or described herein. In some embodiments, the activities of method 800 can be performed in the order presented. In other embodiments, the activities of method 800 can be performed in any suitable order. In still other embodiments, one or more of the activities of method 800 can be combined or skipped. In many embodiments, system 300 (FIGS. 3-4), machine learning architecture 350 (FIGS. 3-4), electronic platform 330 (FIGS. 3-4), and/or basket composition model 450 (FIG. 4) can be suitable to perform method 800 and/or one or more of the activities of method 800. In these or other embodiments, one or more of the activities of method 800 can be implemented as one or more computer instructions configured to run at one or more processing modules and configured to be stored at one or more non-transitory memory storage modules. Such non-transitory memory storage modules can be part of a computer system such as system 300 (FIGS. 3-4), machine learning architecture 350 (FIGS. 3-4), electronic platform 330 (FIGS. 3-4), and/or basket composition model 450 (FIG. 4). The processing module(s) can be similar or identical to the processing module(s) described above with respect to computer system 100 (FIG. 1).

In many embodiments, method 800 can comprise an activity 810 of generating a feature vector for a user based, at least in part, on historical data pertaining to the user's previous transactions. The feature vector may include any features described or mentioned in this disclosure, including any of the customer features, item features, and/or basket features.

Method 800 can further comprise an activity 820 of generating likelihood scores for a plurality of items. The likelihood score for each item can indicate a likelihood or probability that the user will repurchase the item for a predicted basket being generated.

Method 800 can further comprise an activity 830 of generating a basket size prediction for the predicted basket based, at least in part, on the feature vector for the user. The basket size prediction can be generated using a basket composition model of the machine learning architecture (e.g., one or more random forest decision tree models and/or one or more gradient boosted regression models). The basket size prediction indicates or predicts a number of items to be included in the predicted basket based on the feature vector for the user.

Method 800 can further comprise an activity 840 of populating the predicted basket with one or more items based on the basket size prediction and the likelihood scores. The basket size prediction can be used to select the number of the one or more items included in the predicted basket. The likelihood scores can be utilized to select the one or more items to be included in the predicted basket from the plurality of items. For example, given a basket size prediction indicating that L items should be included in the predicted basket, the L items having the highest likelihood scores may be selected from the plurality of items and included in the predicted basket.

FIG. 9 illustrates a flow chart for an exemplary method 900, according to certain embodiments. Method 900 is merely exemplary and is not limited to the embodiments presented herein. Method 900 can be employed in many different embodiments or examples not specifically depicted or described herein. In some embodiments, the activities of method 900 can be performed in the order presented. In other embodiments, the activities of method 900 can be performed in any suitable order. In still other embodiments, one or more of the activities of method 900 can be combined or skipped. In many embodiments, system 300 (FIGS. 3-4), machine learning architecture 350 (FIGS. 3-4), electronic platform 330 (FIGS. 3-4), and/or quantity prediction model 460 (FIG. 4) can be suitable to perform method 900 and/or one or more of the activities of method 900. In these or other embodiments, one or more of the activities of method 900 can be implemented as one or more computer instructions configured to run at one or more processing modules and configured to be stored at one or more non-transitory memory storage modules. Such non-transitory memory storage modules can be part of a computer system such as system 300 (FIGS. 3-4), machine learning architecture 350 (FIGS. 3-4), electronic platform 330 (FIGS. 3-4), and/or quantity prediction model 460 (FIG. 4). The processing module(s) can be similar or identical to the processing module(s) described above with respect to computer system 100 (FIG. 1).

In many embodiments, method 900 can comprise an activity 910 of generating a feature vector for a user based, at least in part, on historical data pertaining to the users' previous transactions. The feature vector may include any features described or mentioned in this disclosure, including any of the customer features, item features, and/or basket features.

Method 900 can further comprise an activity 920 of selecting one or more items to be included in a predicted basket for the user.

Method 900 can further comprise an activity 930 of generating an item quantity prediction for each of the one or more items included in the predicted basket based, at least in part, on the feature vector for the user. In certain embodiments, the item quantity predictions may be generated using a quantity prediction model of the machine learning architecture (e.g., a random forest decision tree model and/or a gradient boosted regression model described above). For each item included in the predicted basket, the item quantity prediction predicts purchase quantity desired by the user.

Method 900 can further comprise an activity 940 of populating a quantity selection option for each of the one or more items included in the predicted basket based on the item quantity prediction generated for each of the one or more items.

As evidenced by the disclosure herein, the techniques set forth in this disclosure are rooted in computer technologies that overcome existing problems in known prediction systems, specifically problems dealing with providing accurate predictions in connection with generating predicted baskets. The techniques described in this disclosure provide a technical solution (e.g., one that utilizes various machine learning techniques) for overcoming the limitations associated with known techniques. For example, the prediction techniques described herein take advantage of novel machine learning techniques to learn functions for selecting items for predicted baskets, and predicting optimal sizes and item quantities for predicted baskets. This technology-based solution marks an improvement over existing capabilities and functionalities related to computer systems by improving the accuracy and quality of the predictions, and personalizing the predictions for each of the users.

In certain embodiments, the techniques described herein can advantageously improve user experiences with electronic platforms by quickly generating predictions with high accuracy that enable users to easily finalize digital shopping carts in connection with repurchasing or restocking items. In various embodiments, the techniques described herein can be executed dynamically in real time by an electronic platform. In many embodiments, the techniques described herein can be used continuously at a scale that cannot be reasonably performed using manual techniques or the human mind (e.g., due to the large numbers of customers, large quantity of features that are extracted from historical data for each of the customer, and complex operations executed by the machine learning architecture). The data analyzed by the machine learning techniques described herein can be too large to be analyzed using manual techniques.

Furthermore, in a number of embodiments, the techniques described herein can solve a technical problem that arises only within the realm of computer networks, because machine learning does not exist outside the realm of computer networks.

Although systems and methods have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-9 may be modified, and that the foregoing discussion of certain of these embodiments does not necessarily represent a complete description of all possible embodiments. For example, one or more of the procedures, processes, or activities of FIGS. 8-9 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processors, perform:
generating a feature vector for a user based, at least in part, on historical data pertaining to previous transactions of the user;
generating, using a basket composition model of a machine learning architecture, a basket size prediction for a predicted basket based, at least in part, on the feature vector for the user, wherein the basket size prediction indicates a number of items to be included in the predicted basket, wherein the basket composition model combines a pair of separately trained gradient boosted regression models for the predicted basket, wherein the pair of separately trained gradient boosted regression models comprise a first gradient boosted regression model and a second gradient boosted regression model, and wherein generating the basket size prediction for the predicted basket further comprises:
using the first gradient boosted regression model to determine a first output comprising a repurchase basket size value;
using the second gradient boosted regression model to determine a second output comprising a basket size value; and
combining the first output and the second output to generate the basket size prediction; and
populating the predicted basket with one or more items, wherein the basket size prediction determines a number of the one or more items included in the predicted basket, and wherein the one or more items are selected from a plurality of items based, at least in part, on likelihood scores associated with the plurality of items.

2. The system of claim 1, wherein:
the plurality of items are ranked or ordered based, at least in part, on the likelihood scores;
the basket size prediction predicts the number of items desired by the user for inclusion in the predicted basket based, at least in part, on the feature vector for the user, the first output comprising the repurchase basket size value, and the second output comprising the basket size value; and
the one or more items included in the predicted basket are selected based on ranking or ordering of the likelihood scores associated with the plurality of items.

3. The system of claim 1, wherein the first gradient boosted regression model and the second gradient boosted regression model are trained using historical data for a plurality of users.

4. The system of claim 1, wherein the basket composition model comprises a random forest decision tree model that is configured to generate the basket size prediction, and the random forest decision tree model is trained using historical data for a plurality of users.

5. The system of claim 1, wherein the feature vector includes:
a plurality of customer features pertaining to the user and previous transactions conducted by the user; and
a plurality of basket features pertaining to baskets included in the previous transactions conducted by the user.

6. The system of claim 1, wherein the predicted basket is displayed on a graphical user interface of a user device operated by the user, and the predicted basket is automatically populated with the number of the one or more items without requiring the user to select the one or more items or a quantity of the one or more items.

7. The system of claim 6, wherein the graphical user interface includes a submission option that enables the one or more items included in the predicted basket to be added to a digital shopping cart.

8. The system of claim 6, wherein the graphical user interface includes one or more options for manipulating contents of the predicted basket, and the one or more options comprise removing the one or more items from the predicted basket or changing a quantity of the one or more items in the predicted basket.

9. The system of claim 1, wherein:
the machine learning architecture is integrated into an electronic commerce platform that is accessible over a computer network;
the one or more items correspond to one or more grocery items; and
the predicted basket facilitates repurchasing the one or more grocery items.

10. The system of claim 1, wherein:
the machine learning architecture further comprises a quantity prediction model;
the quantity prediction model is configured to generate a respective item quantity prediction for each of the one or more items included in the predicted basket; and
the respective item quantity prediction for each of the one or more items is used to determine a respective purchase quantity for each of the one or more items included in the predicted basket.

11. A method implemented via execution of computing instructions configured to run at one or more processors and configured to be stored at non-transitory computer-readable media, the method comprising:
generating a feature vector for a user based, at least in part, on historical data pertaining to previous transactions of the user;
generating, using a basket composition model of a machine learning architecture, a basket size prediction for a predicted basket based, at least in part, on the feature vector for the user, wherein the basket size prediction indicates a number of items to be included in the predicted basket, wherein the basket composition model combines a pair of separately trained gradient boosted regression models for the predicted basket, wherein the pair of separately trained gradient boosted regression models comprise a first gradient boosted regression model and a second gradient boosted regression model, and wherein generating the basket size prediction for the predicted basket further comprises:
using the first gradient boosted regression model to determine a first output comprising a repurchase basket size value;
using the second gradient boosted regression model to determine a second output comprising a basket size value; and
combining the first output and the second output to generate the basket size prediction; and
populating the predicted basket with one or more items, wherein the basket size prediction determines a number of the one or more items included in the predicted basket, and wherein the one or more items are selected from a plurality of items based, at least in part, on likelihood scores associated with the plurality of items.

12. The method of claim 11, wherein:
the plurality of items are ranked or ordered based, at least in part, on the likelihood scores;
the basket size prediction predicts the number of items desired by the user for inclusion in the predicted basket based, at least in part, on the feature vector for the user, the first output comprising the repurchase basket size value, and the second output comprising the basket size value; and
the one or more items included in the predicted basket are selected based on ranking or ordering of the likelihood scores associated with the plurality of items the plurality of items.

13. The method of claim 11, wherein the first gradient boosted regression model and the second gradient boosted regression model are trained using historical data for a plurality of users.

14. The method of claim 11, wherein the basket composition model comprises a random forest decision tree model that is configured to generate the basket size prediction, and the random forest decision tree model is trained using historical data for a plurality of users.

15. The method of claim 11, wherein the feature vector includes:
a plurality of customer features pertaining to the user and previous transactions conducted by the user; and
a plurality of basket features pertaining to baskets included in the previous transactions conducted by the user.

16. The method of claim 11, wherein the predicted basket is displayed on a graphical user interface of a user device operated by the user, and the predicted basket is automatically populated with the number of the one or more items without requiring the user to select the one or more items or a quantity of the one or more items.

17. The method of claim 16, where in the graphical user interface includes a submission option that enables the one or more items included in the predicted basket to be added to a digital shopping cart.

18. The method of claim 16, wherein the graphical user interface includes one or more options for manipulating contents of the predicted basket, and the one or more options comprise removing the one or more items from the predicted basket or changing a quantity of the one or more items in the predicted basket.

19. The method of claim 11, wherein:
the machine learning architecture is integrated into an electronic commerce platform that is accessible over a computer network;
the one or more items correspond to one or more grocery items; and
the predicted basket facilitates repurchasing the one or more grocery items.

20. The method of claim 11, wherein:
the machine learning architecture further comprises a quantity prediction model;
the quantity prediction model is configured to generate a respective item quantity prediction for each of the one or more items included in the predicted basket; and
the respective item quantity prediction for each of the one or more items is used to determine a respective purchase quantity for each of the one or more items included in the predicted basket.

* * * * *